3,556,569
CONNECTOR ASSEMBLY FOR JOINING TUBULAR MEMBERS AT RIGHT ANGLES
Kenneth N. Bruhn, Albert Lea, Minn., assignor to Streater Industries, Inc., Albert Lea, Minn., a corporation of Minnesota
Filed July 24, 1969, Ser. No. 844,308
Int. Cl. E04g 17/00
U.S. Cl. 287—54
6 Claims

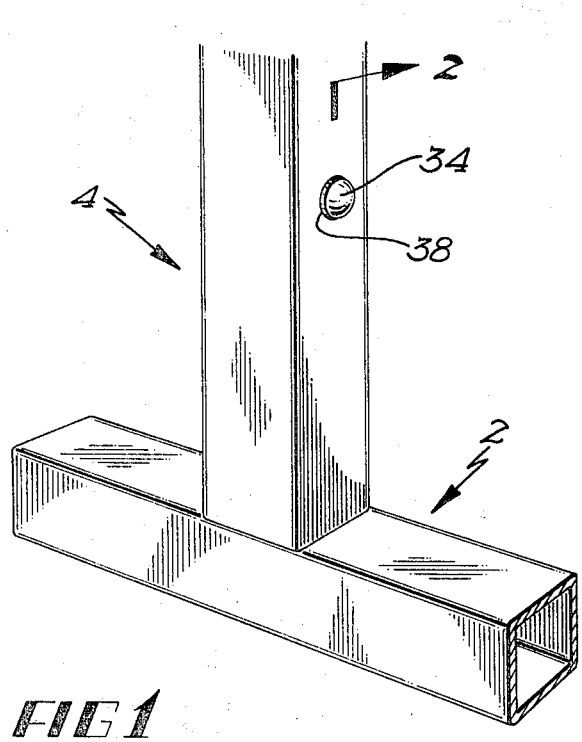
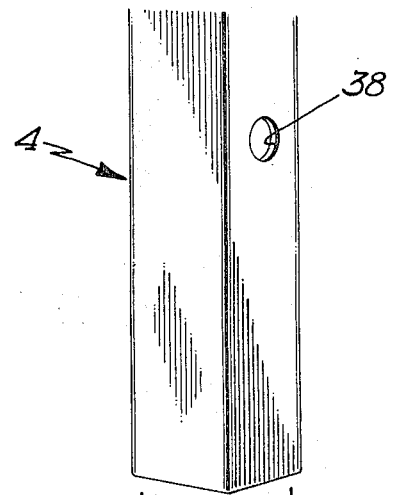
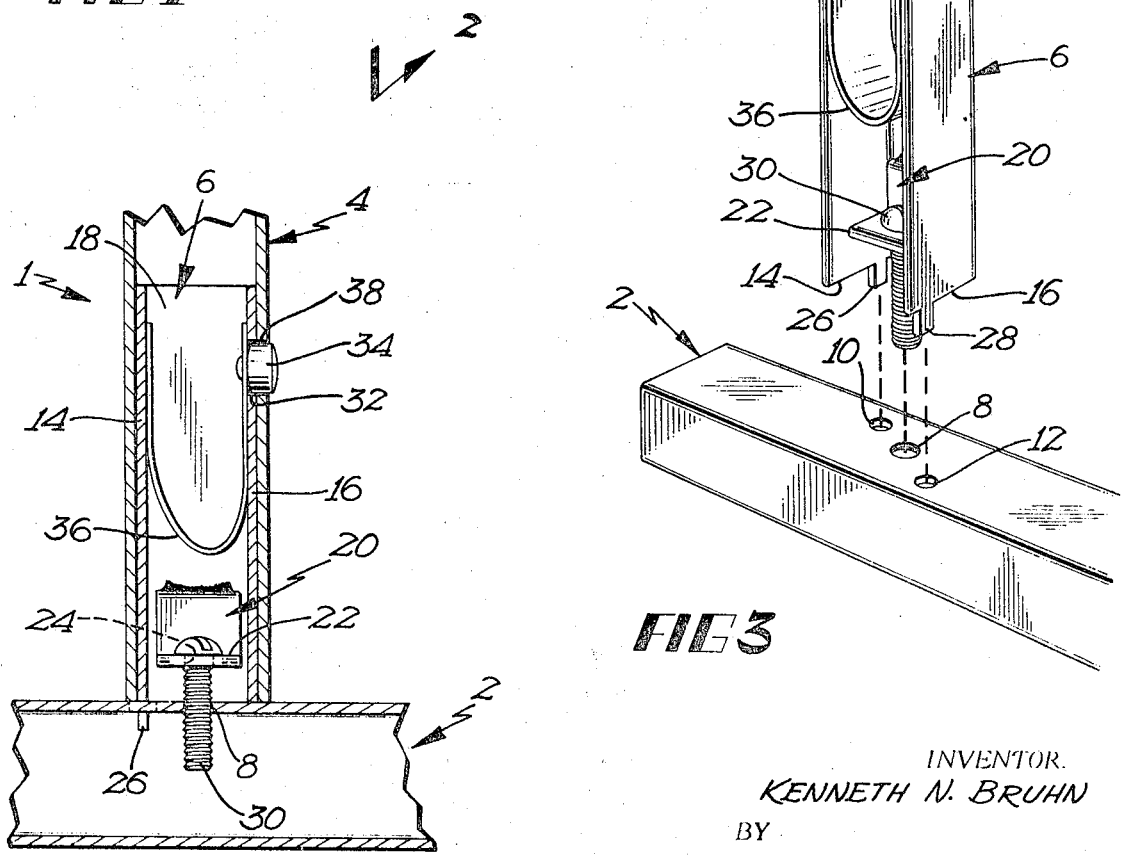
FIG 1
FIG 2
FIG 3
INVENTOR.
KENNETH N. BRUHN
BY
Wayne B. Easton
ATTORNEY United States Patent Office 3,556,569
Patented Jan. 19, 1971

ABSTRACT OF THE DISCLOSURE

The invention relates to a connector assembly for connecting two tubular members together at right angles to each other. The connector assembly is attached at right angles to a first tubular member by utilizing prong and screw means. The telescoping principle is used and the connector assembly has a resiliently biased button which snaps into a hole in a second tubular member to lock the members together.

---

The invention relates to a new and improved connector assembly for connecting two tubular members together at right angles to each other.

Structural tubular members having rectangular cross sections are commonly used for a wide variety of frame type structures such as scaffolding, wall partitions and the frames of display fixtures to mention a few. The connecting of tubular members to form right angle joints has been the subject of considerable development work and welding methods have been used to provide permanent joints.

In instances where the appearance of a tubular type frame structure is of importance there are certain problems which cause difficulties. A frame structure in which the joints are welded may be too large for existing paint line or plating tank capacities and in those instances the frame structures must be either brush or spray painted by hand. If the individual lengths of tubular members are prefinished and shipped for subsequent erection at the destination, the on-the-job welding at the erection site will cause marring of the finishes such that touching-up of damaged surfaces is required.

The present invention is directed to a connector assembly for joining lengths of tubular members together at right angles to each other. The utilization of the connector assembly only involves the drilling of four holes in the tubular members to be joined and the connector assembly itself is not visible when in use except for a resiliently biased button, which is a part thereof, which protrudes from one of the drilled holes. The other three drilled holes, of the four drilled holes referred to, are not visible. The connector assembly may thus be used without causing any damage to prefinished tubular members. Also, the drilling of the four holes may be performed at the site where a frame is being erected. A workman having a supply of connector assemblies and a supply of standard length tubing would be able to erect a frame structure having right angle joints of any desired design without performing any metal working operations other than drilling holes and cutting tubular members to required lengths.

A main object of the invention is to provide a new and improved connector assembly for joining tubular members together at right angles to each other. A further object is to provide such a connector assembly which facilitates the joining of tubular members with only cutting and drilling operations which can be performed at the erection site without marring or otherwise damaging the prefinished tubular members.

Other objects and advantages of the invention will become apparent from the following specification, drawings and appended claims.

In the drawings:

FIG. 1 is a perspective view of a tubular member right angle joint having a connector assembly embodying the invention concealed inside thereof;

FIG. 2 is a sectional view taken on line 2—2 of FIG. 1 in which the connector assembly may be seen; and FIG. 3 is an exploded perspective view showing the connector assembly and two tubular members to be joined thereby.

In the drawings, the illustrated connector assembly 1 embodying the invention is designed and adapted to join tubular members 2 and 4, each having identical cross sectional dimensions, at right angles to each other. Connector assembly 1 has an elongated U-shaped housing 6 which fits telescopically in the tubular member 4.

Tubular member 2 has three diagonally arranged holes in one side thereof arranged with a centrally located hole 8 being straddled by a pair of holes 10 and 12. A simple drill jig may be utilized to facilitate the precise locating of the three holes and, by reason of the simplicity of the operation, may be performed just as well at a construction or erection site as on a factory production line. This is advantageous in instances where the tubular member 2 is a part of a fixed structure, as in a building, and a tubular member 4 is to be attached to it by a workman on the site.

Connector housing 6 has two side walls 14 and 16 and a bottom wall 18. A bracket 20 is attached to the bottom wall 18, as by welding, and has a flange portion 22 extending normal thereto. Flange portion 22 is provided with a hole 24. Connector housing walls 14 and 16 have prongs 26 and 28 extending from the ends thereof adjacent tubular member 2. The prongs are arranged or positioned so that they are insertable into the holes 10 and 12 when the connector housing 6 is attached at right angles to the tubular member 2. Prongs 26 and 28 are illustrated as having rectangular shapes but, regardless of their shapes, it is intended that they fit snugly in the holes 10 and 12 to contribute to the rigidity of the connection. When viewed from one end of connector housing 6 the prongs 26 and 28 and the flange hole 24 are seen to be in a single plane which is inclined relative to the connector walls 14 and 16.

A screw 30 is provided for fastening the connector housing b to the tubular member 2 which extends through the flange hole 24 and threadedly engages threads in the hole 8 which are formed beforehand by tapping or making screw 30 a self-tapping screw.

Connector housing 6 has a button hole 32 in the wall 16 thereof in which is disposed a cylindrically shaped button 34 having the same nominal diameter as the hole 32 and a greater height than the thickness of the wall 16. Resilient means having the form of a U-shaped leaf spring 36 which is retained between the housing walls 14 and 16 is provided for biasing the button in an outwardly direction. One end of the spring 36 is fixedly attached to the button 34 as by riveting or brazing and the spring and button assembly may be easily installed or removed. With the spring and button assembly removed, the screw 30 is easily accessible with a screw driver.

Tubular member 4 has a hole 38 in one wall thereof which is spaced from one end thereof the same distance that connector hole 32 is spaced from the corresponding end of the connector housing 6. Tubular member 4 telescopically slips over the connector housing 6 and assumes a locked position relative thereto when the button 34 is disposed in the hole 38. The cross sectional dimensions of connector housing 6 are such that an appropriate clearance is provided between it and tubular member 4.

What is claimed is:

1. A connector assembly for joining tubular members having rectangular cross sections at right angles to each other comprising, an elongated housing having two side walls and a bottom wall, a bracket attached to one of said walls and having a transversely extending flange portion in spaced relation to one end of said housing, a hole in said flange portion, a screw disposed in said flange hole, a pair of prongs extending from said one end of said housing, a button hole in one of said walls in spaced relation to said one end of said housing, a button in said button hole, and resilient means biasing said button outwardly so that a portion of said button protrudes outwardly relative to the outer surface of said one of said walls.

2. A connector assembly according to claim 1 wherein said flange hole and said prongs are in a single plane which is inclined relative to said housing side walls.

3. A connector assembly according to claim 2 wherein said screw is a self-taping screw.

4. A connector assembly according to claim 1 wherein said prongs are rectangularly shaped.

5. A connector assembly according to claim 1 wherein said button is cylindrically shaped and has a height greater than the thickness of said one of said housing walls.

6. A connector assembly according to claim 5 wherein said resilient means has the form of a U-shaped leaf spring, said spring having one end thereof fixedly attached to said button.

References Cited

UNITED STATES PATENTS

| 2,989,155 | 6/1961 | Ocker | 287—54C |
| 3,353,853 | 11/1967 | Heywood | 287—54C |

FOREIGN PATENTS

| 656,903 | 1/1965 | Belgium | 287—54C |

KENNETH DOWNEY, Primary Examiner

A. V. KUNDRAT, Assistant Examiner

U.S. Cl. X.R.

287—56